US007231995B1

(12) United States Patent
Polz et al.

(10) Patent No.: US 7,231,995 B1
(45) Date of Patent: Jun. 19, 2007

(54) FRONT HOOD ASSEMBLY

(75) Inventors: Andreas Polz, Gelsenkirchen (DE); Peter Mrowka, Remscheid (DE); Lazlo Kreth, Pfungstadt (DE); Ingo Renneisen, Hochheim (DE)

(73) Assignees: Edscha AG, Remscheid (DE); Adam Opel AG, Ruesselsheim (DE)

( * ) Notice: Subject to any disclaimer, the term of this patent is extended or adjusted under 35 U.S.C. 154(b) by 0 days.

(21) Appl. No.: 09/979,232

(22) PCT Filed: May 17, 2000

(86) PCT No.: PCT/DE00/01603

§ 371 (c)(1),
(2), (4) Date: Feb. 8, 2002

(87) PCT Pub. No.: WO00/69709

PCT Pub. Date: Nov. 23, 2000

(30) Foreign Application Priority Data

| May 17, 1999 | (DE) | ................................. 199 22 107 |
| May 17, 1999 | (DE) | ................................. 199 22 454 |
| May 17, 1999 | (DE) | ................................. 199 22 455 |
| Oct. 8, 1999 | (DE) | ................................. 199 48 460 |

(51) Int. Cl.
B62D 25/12 (2006.01)

(52) U.S. Cl. .............. 180/69.21; 180/274; 296/187.04; 296/DIG. 14; 16/222

(58) Field of Classification Search .............. 180/69.2, 180/69.21, 69.22, 69.23, 69.24, 271, 274; 280/748; 296/187.04 X, 193.11 X, 187.04, 296/193.11, 187.09; 292/137, 341.15, 341.18, 292/341.12, 340, 201, 216, DIG. 5, DIG. 14, 292/DIG. 23, DIG. 65; 16/222; 188/376; B60R 21/34; B62D 25/12
See application file for complete search history.

(56) References Cited

U.S. PATENT DOCUMENTS

| 3,643,755 A | | 2/1972 | Gionet et al. |
| 4,382,312 A | * | 5/1983 | Liggett et al. ................. 16/365 |
| 5,437,348 A | * | 8/1995 | Cady et al. .............. 180/69.21 |
| 5,697,467 A | * | 12/1997 | Howard .................... 180/69.21 |
| 6,237,992 B1 | * | 5/2001 | Howard ................. 296/187.04 |
| 6,257,657 B1 | * | 7/2001 | Sasaki .................... 296/187.09 |
| 6,330,734 B1 | * | 12/2001 | Cho ............................. 16/376 |
| 6,439,330 B1 | * | 8/2002 | Paye ........................ 180/69.21 |
| 6,530,449 B2 | * | 3/2003 | Sasaki et al. ............... 180/274 |
| 6,543,086 B2 | * | 4/2003 | Bjureblad et al. ............ 16/222 |
| 6,588,526 B1 | * | 7/2003 | Polz et al. ................ 180/69.21 |

FOREIGN PATENT DOCUMENTS

| DE | 2711338 | 9/1978 |
| DE | 2711339 | 9/1978 |

(Continued)

*Primary Examiner*—Christopher P. Ellis
*Assistant Examiner*—John Walters
(74) *Attorney, Agent, or Firm*—Davidson, Davidson & Kappel, LLC

(57) ABSTRACT

A front hood system has a front hood of a vehicle that is coupled to the frame of the vehicle via at least one multiple-joint hinge. In addition, the vehicle's front opening hood can be latched by means of at least one hood lock. At least one multiple-joint hinge has at least one link that can separate into at least two parts due to the force of impact of a pedestrian.

38 Claims, 7 Drawing Sheets

FOREIGN PATENT DOCUMENTS

| | | |
|---|---|---|
| DE | 2737876 | 3/1979 |
| DE | 2841315 | 4/1980 |
| DE | 3047696 | 7/1982 |
| DE | 3315159 | 10/1983 |
| DE | 3315129 | 10/1984 |
| DE | 2922893 | 1/1989 |
| DE | 3916739 A1 | 11/1990 |
| DE | 3916739 C2 | 6/1991 |
| DE | 69400889 | 12/1994 |
| DE | 19721565 | 12/1997 |
| DE | 19706878 | 8/1998 |
| DE | 19710417 | 9/1998 |
| DE | 19712961 | 10/1998 |
| EP | 0509690 | 10/1992 |
| EP | 0630801 | 12/1994 |
| FR | 2690405 | 10/1993 |
| JP | 59-26370 | 6/1984 |
| JP | 4-212677 | 11/1992 |
| JP | 09315266 | 12/1997 |
| JP | 10258774 | 9/1998 |
| JP | 11115680 | 4/1999 |
| JP | 11291948 | 10/1999 |
| WO | 9718108 | 5/1997 |

* cited by examiner

FRONT HOOD ASSEMBLY

BACKGROUND OF THE INVENTION

The invention relates to a front-hood arrangement wherein a front hood of a vehicle is coupled to the frame of the vehicle via at least one multiple-joint hinge, which front hood furthermore can be locked by means of at least one hood lock.

By now, numerous safety devices, such as airbags and the like, for passengers in automobiles are known from practical applications. By contrast, protective measures for pedestrians who are hit by the front end of a passenger automobile have to date scarcely been proposed or implemented in practice. Accidents involving pedestrians which take place at speeds of up to 60 km/h have proven particularly problematical, since, if the pedestrian is hit head-on, his head often strikes the engine hood of the passenger automobile, and the pedestrian dies from his injuries. The seriousness of the injury results from the fact that although the front or engine hood, which is usually formed from thin metal sheet, would tend to bend, it then strikes parts which are arranged beneath the engine hood and in practice cannot be deformed or can only be deformed with difficulty, such as the engine block, the suspension-leg carrier, the air filter, the valve cover or the frame side and cross members of the vehicle. It would be desirable if the consequences of an impact in particular of the head of a pedestrian could be made less severe. By contrast, at speeds of over 60 km/h, the pedestrian, after he has been hit, is thrown over the vehicle.

DE-C-29 22 893 proposes that the engine hood and the wing, in the region of the joint formed between these two parts, be supported, by means of energy-absorbing U-sections which run along the two parts, on body components, and in the event of a collision these U-sections convert the impact into deformation energy. A first drawback of this arrangement is that considerable forces have to act on the sections in order to bend them. Moreover, these otherwise useless U-sections are expensive to procure and difficult to fit.

DE-A-27 37 876 describes an impact protection device which uses a prestressed pivot flap to displace a mesh-like absorption element out of an at-rest position, in which the mesh rests substantially on the front hood, into an absorbing position, which runs substantially in front of the windshield of the automobile. This device is used more to protect the windshield than the pedestrian from an excessively hard impact on the front hood. Moreover, any contact with the sensor which triggers the pivoting movement and is integrated in the front bumper can cause the mesh to be triggered, with the result that a whole range of situations arise in which the mesh completely blinds the driver.

DE-A-28 41 315 describes a safety device in which, in reaction to a signal from a sensor arranged at the front of a vehicle, to detect a collision with a pedestrian, the front hood is displaced out of an at-rest position into an impact position, which is raised with respect to the at-rest position, by a piston-cylinder unit, the displacement being effected by an energy store. During the raising operation, the front hood is pivoted about a horizontal pivot pin which is arranged at the front of the vehicle.

DE-A-197 10 417 describes an arrangement for lifting the front hood in which pivoting about a horizontal pivot pin arranged at the front of the vehicle is triggered by the same pneumatic spring which also assists with the raising of the front hood which is coupled to the other end.

DE-A-197 21 565 describes a safety device on motor vehicles for raising the front hood in which the raising of the front hood takes place in a speed-dependent manner by means of a mechanism which is integral with the hood lock. For this purpose, either the unlocking of the lock which is acted on by a compression spring, which for safety reasons is normally triggered from the driver's compartment, is triggered by a sensor which is triggered by an impact, or alternatively, particularly at relatively high speeds, a piston-cylinder unit which is integrated in the catch bolt of the hood lock is expanded by a propelling charge. A first drawback of this arrangement is that the force required to close the front hood must not exceed a defined threshold, in order to allow the driver to close the front hood with ease. Since the forces which strike in the event of an accident involving a person are considerable, the front hood is pressed down rapidly, and the known injuries occur, in particular in the region of the head. Providing a propelling charge in order to expand a piston-cylinder unit also causes problems, since the service life of this charge, in particular in a relatively unprotected arrangement, is limited, and the charge is difficult to exchange. Moreover, there is a risk of the compression spring and the piston-cylinder unit being triggered simultaneously, with the result that the opening of the front bonnet would become so great that the airstream would bring the hood into contact with the windshield, thus preventing the driver from being able to see.

DE-A-27 11 338 describes a device for damping the impact of a pedestrian, in which an airbag is arranged in the region of the cowl, the filling of which airbag is triggered by a sensor signal. In this case, the airbag may be arranged in such a way that, at the same time, it raises a part of the front hood; to do this it overcomes a spring force which preloads two links, which are connected to one another via a rotation point and one of which is arranged rotatably on the front hood and the other of which is arranged rotatably on a fixed part of the motor vehicle, into an angled position. Furthermore, it is proposed to arrange resilient profiled bodies in strip form in the manner of a seal between hood and side parts, in order in this way to provide further protection in the event of an impact.

DE-A-27 11 339 describes a front hood which is coupled at the front side and in which the coupling is designed to be resilient, in such a manner that it allows a horizontal displacement of the front hood through the impact of a pedestrian, the front hood which is displaced toward the rear being connected at the rear side to one end of a rigid locking element, the other end of which, in the event of displacement of the front hood, is displaced upward and toward the rear in a guide curve in such a manner that the front hood executes an upward movement. This lifting only takes place if horizontal displacement of the front hood has actually occurred, which is not always the case, for example, in the event of impacts of children.

EP-A-0 509 690 describes a front hood, which at its front side is coupled to the vehicle structure in such a manner that, as a result of an impact, the front hood is displaced toward the rear, the closure or pivot means arranged at the rear side, as a result of a movement of the front hood toward the rear, triggering an upward pivoting movement of the front hood, so that the deformation travel of the hood is increased in the event of the impact of a pedestrian. The pivoting movement is guided, for example, by a four-joint hinge, which is otherwise used to pivot the front hood when it is desired to release access to the engine and other parts. In this case too, the front hood is only lifted in the event of a very substantial displacement of the front hood, while a weak impact does not displace the front hood toward the rear and therefore upward.

DE-A-197 12 961 describes the arrangement of a front hood on a vehicle in which a hinge is arranged on a hinge mount, which hinge, in the event of a collision with a pedestrian, is pivoted upward in order to raise the front hood. A problem of this arrangement is that the hood lock for the front hood defines a pivot axis which does not allow optional displacement of the hinge mount, and consequently the hinge mount described is, for example, blocked.

EP-B-0 630 801 describes a front-hood arrangement, in which the hinge arrangements for mounting the front hood on the body are provided in the frontal region of the engine compartment, and the locking means are arranged in the rear part of the engine compartment. The hinge arrangement is designed as a four-joint mechanism which, as a particular feature, can be pivoted overall about an axis which runs between the part which forms the body part and the body, so that there is no change in the links of the four-joint mechanism when the front hood is opened and closed or in the event of a collision with a pedestrian. To open and close, the front hood is displaced about the axis together with the four-joint hinge, while in the event of a collision with a pedestrian the four-joint mechanism is responsible for the vertical and horizontal change in position of the front hood.

DE-C-39 16 739 describes a four-joint coupling for a trunk lid, in which one of the two links of the four-joint mechanism is designed as a "buckling joint", and for installation of the tailgate can be activated by loosening a screw, with the result that the actual pivoting movement of the four-joint mechanism is left and the trunk lid can be pulled back so that the tailgate can be installed. It will be understood that in this position the trunk lid is not latched in the lock. It is clear that this change to the four-joint arrangement does not take place as a result of a collision with a pedestrian, but rather through the loosening of a screw, which is impossible in the event of an impact.

DE-A-33 15 129 describes a tailgate hinge which, in a manner which is often to be encountered, is designed as a swan neck and in which the principal joint provided for the application can be put out of operation as a result of a screw connection which connects a first section and a second section of the swan-neck section being released, with the result that a spring locks the first section and the pivot joint then pivots about an auxiliary joint. However, this is not a multiple joint, the screw connection being released not through the impact of a pedestrian and not being intended to be destroyed in the event of external loads on the tailgate.

FR-A-2 690 405 describes a trunk lid which can be pivoted about a pivot axis defined by a single joint, a support device which can be pivoted about an axis which is parallel to the axis being designed as a buckling joint arrangement which is arranged pivotably in the region of the trunk lid. Already, this is not a multiple joint. Furthermore, the support device, also does not define the pivot axis of the hood arrangement.

Overall, as yet no solution has been proposed which proposes an inexpensive arrangement, which can be readily restored after use and which is so well developed that it could be used in mass-produced vehicles.

SUMMARY OF THE INVENTION

It is the object of the invention to propose a front-hood arrangement that supplies pedestrian protection that can be achieved inexpensively and on an industrial scale.

This object is achieved, for the front-hood arrangement described at the beginning, according to the invention, in that the at least one multiple-joint hinge has at least one link which can separate into at least two parts under the load of an impact of a pedestrian.

The design of the multiple-joint hinge with at least one link designed to be of variable length represents an embodiment of the basic idea of the invention, according to which, in the event of an excessive load, the distance between the two coupling points of the at least one link can be changed, in order, in this way, to release the multiple joint for a further pivoting curve which differs from the actual pivoting curve of the multiple joint.

The front-hood arrangement according to the invention advantageously has three limit positions; in addition to the known closed position, in which the front hood is locked, this being the position which is adopted while the vehicle is driving, and the open position, which is likewise known and in which access to the engine compartment is opened up for an operator, there is also a third limit position, which can be described as the overload position and which is explained in detail below, in order to satisfy the demands imposed on the front hood drawing back in the event of the impact of a pedestrian.

The multiple-joint hinge may advantageously be designed as a four-joint hinge, although it is alternatively possible for it to be designed as a seven-joint hinge or with only one link as a two-joint hinge.

In the starting position, the front hood is locked by the hood lock, which is preferably arranged in the front region of the front hood, the four-joint hinge, comprising two links and two hinge parts, which are connected to the links in an articulated manner at the rotation points arranged in the end regions of the links and which are connected, by known stop means, to the front hood and to the body of the vehicle, defining a pivoting path of the front hood, which allows free, reciprocating pivoting of the front hood between the open position and the closed position to optionally open up access to the engine compartment. In the open position, which is preferably reached with the assistance of a spring, for example a pneumatic spring, the front hood can be held by means of a rod between the body and the front hood, in order to allow an operator access without danger. Alternatively, when a past-dead-center position of the four-joint hinge or of the four-joint hinges is reached, since generally one hinge is arranged at both rear corners of the front hood, which in developed view is of square design, the front hood can be held without external aids.

While the vehicle, which expediently is a passenger automobile, is driving, the front hood is in its closed position and is locked by the hood lock, so that the engine compartment, in which a series of hard components, such as the engine block, the suspension-leg cover and others are arranged, is shut by the front hood in the manner of a protective cover, which is arranged at a sufficient distance from the parts which are dangerous to the head of a pedestrian at least in the event of an impact, and, on the underside of the front hood, has a space optionally lined with a foam, which is designed to be compressible and if appropriate absorbs impact and/or sound energy, or has a free space.

Starting at least from the closed position of the front hood, the front-hood arrangement according to the invention allows the front hood to be displaced toward the overload position, in which the distance between the front hood and the dangerous parts of the engine compartment is reduced; according to the invention, in the event of an overload, the four-joint hinge, as well as, if appropriate, further parts of the front-hood arrangement, for the displacement toward the overload position or into the overload position, convert a proportion of impact energy from the pedestrian into displacement or deformation energy which is such that the impact, when the vehicle is driving at a speed of up to 60 km/h, is very likely not to cause the death of the pedestrian.

Under the load of an impact of a pedestrian, the front hood, by defined buckling of at least one link of the four-joint hinge, is displaced toward the overload position, the displacement travel, as a result of the impact energy being converted due to the gradual yielding of the front hood, alleviating the impact and thus reducing the severity of the impact. It will be understood that a deformation energy of the front hood itself is to be taken into account in this context, this generally only being possible to a limited extent by clamping into a hood lock and two four-joint hinges.

To allow the translational movement of the front hood toward the overload position, at least one of the links of the four-joint hinge is designed so that it can be separated into at least two parts, but if appropriate also into more parts, the nature of the separation, provided that it involves conversion of energy, not being restricted to a specific technical embodiment. Both reversal separations into two parts, by providing energy stores in the manner of springs or the like, and irreversible separations into two parts produced by casings of the link which can be blown off, compressible foam, metal alloys, which at least in sections allow separation into two parts with corresponding interruption to the cross section of the link, or also links which are designed with a clamp fit and are fitted together in two parts, the widening of the press fit supplying the required deformation energy, are suitable.

Expediently, the two partial links of the link, which can be separated into at least two parts, of the four-joint hinge are articulately connected to one another, the articulated connection preferably being cancelled out by a fixing limb, so that the two partial links, in the open and closed positions, behave as one rigid link and only the joints which connect the hinge parts to the links are active. It is advantageously possible for both links of the four-joint hinge to be designed so that they can be separated into at least two parts, with the result that, in the event of separation into two parts, a new effective four-link system is formed, which can be adapted to the front hood according to the desired displacement path. In addition to the advantage that, with two links which can be separated into two parts, the impact energy is distributed over both links, and therefore the front-hood arrangement can be dimensioned better, it is in this way also easier to absorb an asymmetric impact on the front hood, and the displacement travel of the front hood required to convert the impact energy can accordingly be somewhat shorter, with the result that the distance which has to be left between the front hood and the hard parts of the engine compartment can be reduced and the drag coefficient of the vehicle is less impaired. Moreover, it is then possible to provide the translational movement about the intermediate links in such a way that, in the event of pivoting toward the overload position, the pivoting movement about the hood lock defines a rotary movement, so that there is no need to provide for a horizontal shift of the front hood.

Alternatively, it is possible for a first of the two partial links of the at least one link which can be separated into two parts to be arranged releasably on one of the two stop parts, e.g. the body part, so that except in the event of an overload the first partial link assumes the function of a known link, the body-side coupling taking place via an auxiliary joint on the other, second partial link, which second partial link is itself, in turn, coupled to the body part. In the event an overload, the otherwise fixed connection between the second partial link and the body part is eliminated, and the joint which connects the second partial link to the body part is available for displacement of the front hood, with the result that pivoting kinematics which differ from the pivoting movement defined by the auxiliary joint between the first and second partial links and the joint in the hood part, are made possible.

Preferably, the at least one link which can be separated into at least two parts comprises an energy store which stresses the two partial links against the impact energy, wherein, on account of the impact, the rigid section of the partial links can be eliminated. This refinement is particularly advantageous since, although any unintentional loads caused by other overloads, for example by children jumping up and down on the front hood or the like, would lead to a pivoting movement toward the overload position of the front hood, following the unintentional stress the front hood, on account of the energy store, can pivot back into the closed position. This means that the readiness of the vehicle to drive after an overload or an impact can rapidly be restored and, moreover, the four-link hinge can still be used with unchanged characteristics even after a first impact of a pedestrian on the front hood. The energy store is expediently arranged in the link in such a way that, in the closed position, it supports the holding force of the front hood to such an extent that in the event of a head-on collision passenger protection is not reduced.

The energy store expediently comprises a spring, which may optionally be designed as a tension or compression spring and which stresses the link parts against a stop, for which purpose, expediently, in each case one end of the spring acts on in each case one of the partial links. The energy store may, for example, comprise one or more torsion springs arranged on the link. It is possible for one of these springs also to be designed as a click spring, in order to provide an increased starting prestress before the pivoting movement toward the overload position begins.

The energy store may furthermore comprise a deformable constituent which converts the impact energy into deformation energy by irreversible, plastic deformation of the deformable component of the link. In this case, as a result of the link being separated into two parts, the impact energy is reduced by the plastic deformation of the deformable component, the resulting, angled position of the partial links with respect to one another being reversible only by a further plastic deformation, for example with the aid of a suitable tool, for which reason, for this component, after an impact the front hood remains permanently displaced toward its impact position.

A preferred deformable component is a covering of the intermediate joint made from foam or plastic which can be blown off; it is also possible for the entire link to consist of this material. Alternatively, it is possible for the at least one link which can be separated into two parts to be designed as a link which is divided into two short link parts which, by means of an injection-molded plastic cladding, define a desired breaking point which breaks in the event of the normal load being exceeded and thus release the four-joint system without an intermediate joint being provided. This variant has the particular advantage that the four-joint hinge can be restored by exchanging the broken link; alternatively, it is also possible to exchange the entire four-joint hinge and for the defective link to be replaced by recycling. This system has the particular advantage that, in the event of a head-on collision with another vehicle or against a stationary obstacle, the front hood is still held by the other, rigid link, which considerably reduces the risk of the front hood forcing its way through the front window and thus entering the passenger compartment of the vehicle.

As an alternative to the above solution using a plastic covering, it is also possible to employ link parts with connections which can be sheared off, in particular with bolts which pass through the two partial links, can be sheared off and define an inexpensive yet secure and easy to restore connection.

It will be understood that where the above text refers to a link which can be separated into at least two parts, this term is not intended to be restricted to separation into two parts, but also, at the same time, includes separation into more than two partial links, and therefore also, for example, a plurality of intermediate joints.

It will be understood that the fixing limb of the link which can be separated into two parts may comprise both a reversible part and also, at the same time, an irreversible part, with the result that the adapting and designing of the four-joint hinge to the expected impact and to the distance of the impact on the front hood, which differs in size from vehicle model to vehicle model, from the hinge parts, which are mounted on the front hood, of the four-joint hinges can be taken into account, and furthermore standardization can be achieved by different designs substantially of the spring, with a plastically deformable component which it otherwise identical for various models of vehicle.

It will be understood that a front-hood arrangement whose translational movement is completely reversible is particularly preferred, since in particular an arrangement of this type can easily be checked for correct operation and reliability during routine tests carried out on the vehicle for technical inspection thereof. Therefore, it is expedient if, when using components which undergo an irreversible change in the event of a collision, these components are arranged in such a manner that they can be checked for damage by visual inspection.

To ensure a displacement starting from the closed position toward the open position or toward the overload position of the front hood relative to the body of the vehicle, it is expedient for the four-joint hinge, at the hinge part which bears against the body, to be arranged in a fixed position on the body of the vehicle, so that the pivoting movement about the body-side rotation points of the links can be carried out.

According to a preferred refinement of the invention, it is possible, in the event of an impact, for one of the links of the four-joint hinge to compress an energy storage unit, which is prestressed toward the functional position of the link, counter to its prestress in order to at least partially compensate for the change in the at least one link. The rotation point of the link, which during displacement out of the closed position to the open position of the front hood and back is prestressed by the energy storage unit, remains unchanged and is only displaced onto the prestressed energy storage unit, stressing the latter, in the event of a pedestrian impact, with the impact energy being partially absorbed, with the result that the preferably rigid link, together with the associated energy storage unit, compensates for the horizontal displacement of the front hood on account of the at least one link and therefore, even in the event of a head-on collision, advantageously prevents the front hood from being forced into the windshield and therefore into the passenger cell of the vehicle.

In its closed position, the hood lock is expediently designed in such a manner that it allows horizontal displacement of the front hood in order to allow the rotation points, which have been displaced further toward the rear on account of the at least one link in the event of an overload and act on the front hood, of the at least one link by a corresponding translational movement of the front hood toward the rear. For this purpose, the hood lock may be designed in such a manner that it is designed in a standard way for unlocking, but in the closed and locked state provides a horizontal yield space which expediently allows displacement of the front hood toward the rear counter to a resistance, which is likewise reversibly or irreversibly deformable. For example, the yield space may form the receptacle for a compression spring which, for example, prestresses a holding part of the front hood, which is designed as a bracket part and is held locked in the lock, toward a position which allows unlocking and is stressed in the event of a collision with a pedestrian, with the result that some of the impact energy is absorbed. This measure is particularly advantageous if it is necessary to cushion the impact of the head of a child, which is expected to be predominantly in the front region of the front hood. Furthermore, it is possible to line the yield space with a plastic-foam part which crumbles under the pressure of an impact and can be replaced with a spare after the impact, with the result that the ability of the front-hood arrangement to function is retained for further impacts even after a first impact.

Further advantages and features of the invention will emerge from the following description and from the dependent claims.

BRIEF DESCRIPTION OF THE DRAWINGS

The invention is explained in more detail below with reference to the appended drawings and on the basis of preferred exemplary embodiments of a front-hood arrangement according to the invention.

DETAILED DESCRIPTION OF THE INVENTION

Figure 1:
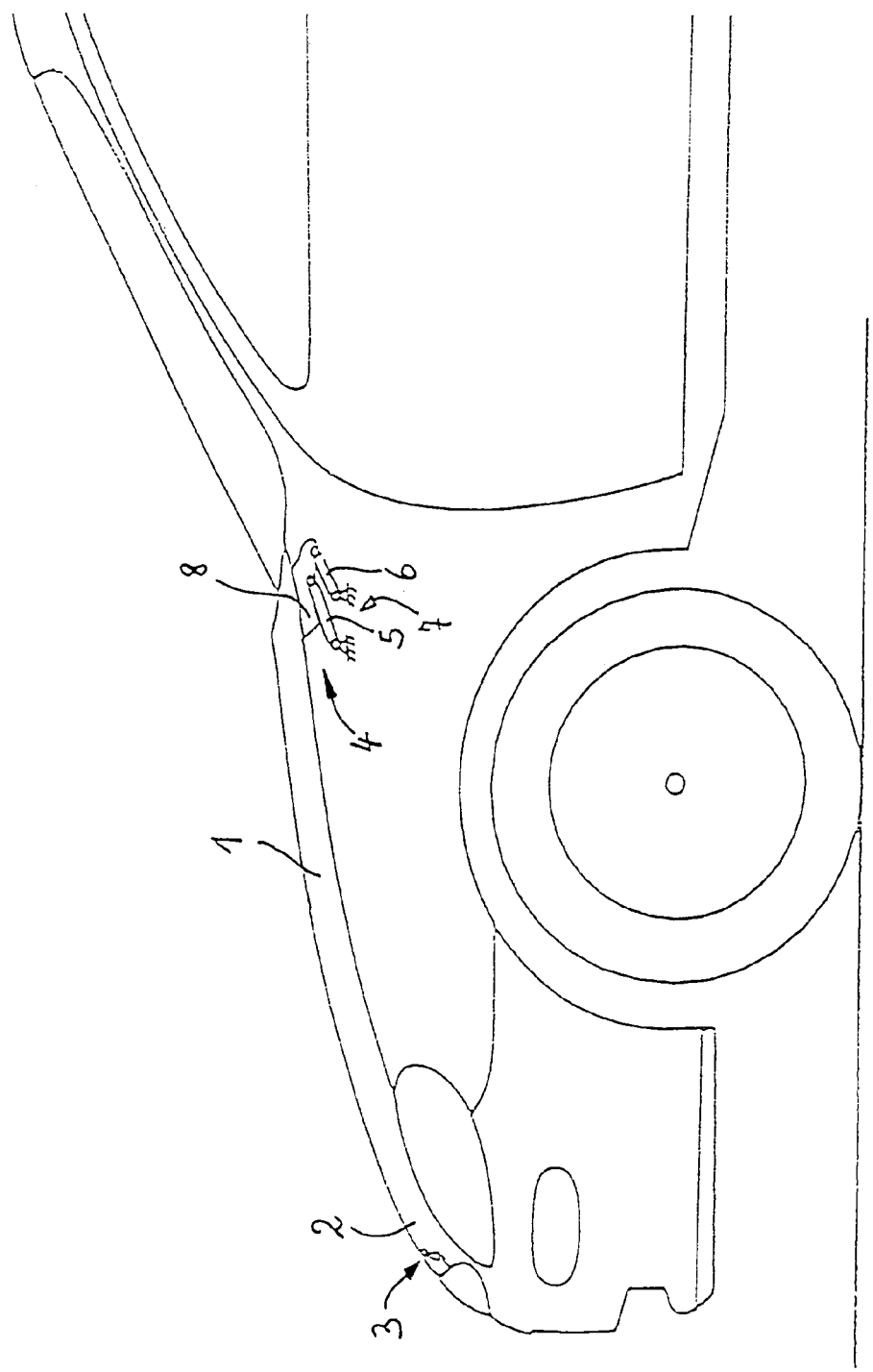
FIG. 1 shows a diagrammatic side view of part of a vehicle with a preferred exemplary embodiment of a front-hood arrangement according to the invention.

FIG. 1 shows a side view of the front part of a motor vehicle, the engine compartment of which can be closed off by a front hood 1. The front hood 1 is locked and unlocked by means of a hood lock 3 arranged in the front region 2 of the front hood 1 and, on its side which faces the driver's compartment, is coupled at each edge side to the frame of the body by means of one of two hinges 4. The hinge 4 is in the present case designed as a four-joint hinge which comprises a longer link 5 and a shorter link 6, the joints of which are pivotably coupled to a part 7 which is secured to the frame and to a part 8 which is arranged on the front hood 1. The front hood 1, by pivoting about the joints on the frame part 7, can be pivoted out of the closed position illustrated in FIG. 1 into its open position and back again.

Figure 2:
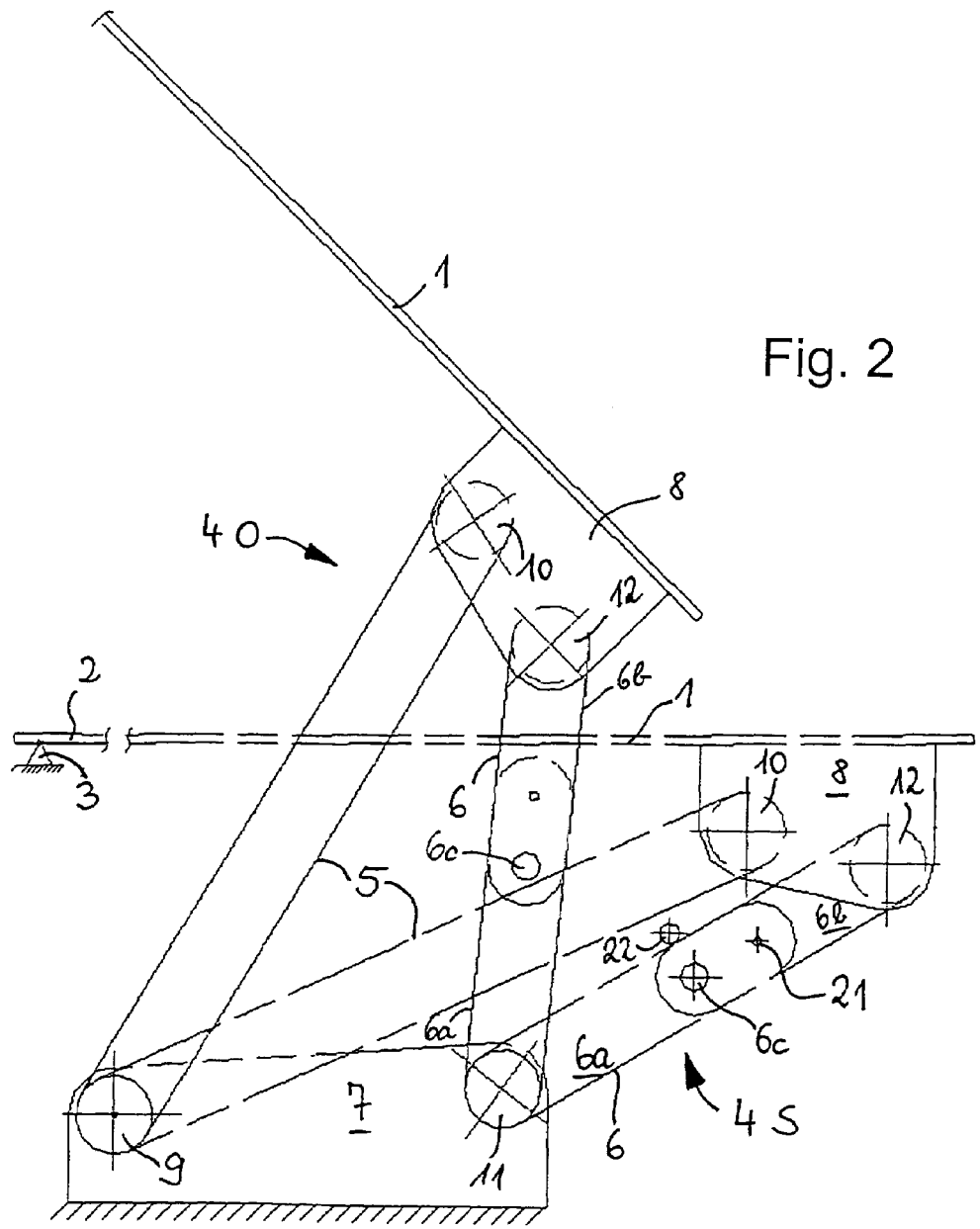
FIG. 2 shows a diagrammatic side view of a first embodiment of a four-joint hinge of the front-hood arrangement from FIG. 1, with the front hood closed and open.

FIG. 2 shows a first preferred embodiment of the hinge 4, the rotary joints of the longer link 5 being denoted by 9 and 10 and the rotary joints of the shorter links being denoted by 11 and 12. It can be seen that all four links 9 to 12 are arranged in a fixed position in the associated frame part 7 or front-hood part 8.

While the longer link 5 is designed as a rigid link, the shorter link 6 is designed as a link which can be separated into two parts and comprises a first partial link 6a, which is assigned to the frame part 7, and a second partial link 6b, which is assigned to the hood part 8. The partial links 6a, 6b are articulately connected to one another by means of a joint 6c which is designed, for example, as a riveted joint and define a rotary joint. The two partial links 6a, 6b are connected to one another at a rotation about the link 6c by a rigid connection produced by means of a locking member 21 designed as a bolt which can be sheared off. Therefore, the link 6 which is assembled from the partial links 6a, 6b behaves as a rigid link 6 as long as the four-joint hinge 4 is in its closed position, which is denoted by the symbol S and is illustrated in dashed lines in FIG. 2, or in its open position, which is denoted by the symbol O and is illustrated by solid lines in FIG. 2. As a result of the bolt 21 being sheared off, the shorter link 6 is able to pivot about the joint 6c, with the result that the pivoting path of the front hood 1 produced by the four-joint hinge 4 can be eliminated, and in particular the distance between the axes of the joints 11, 12, which is defined by a rigid link 6, can be varied with respect to the link which is then active between these two axes.

Furthermore, in FIG. 2 22 denotes a stop which is arranged on the hood part 8, so that, when the front hood 1 is closed, it prestresses the short link 6 against the hood securing means. This advantageously leads to unambiguous positioning of the corners of the hood with respect to the A column. The stop 22 is advantageously adjustable, in order to compensate for tolerances of the body and those involved in production of the hinge 4. However, the stop 22 is used in particular to transmit the impact shock to the shear-off bolt 21 in the event of an overload. Alternatively, it is possible to arrange the stop 22 on the body.

As can be seen more specifically in FIG. 2, part of the dead weight of the front hood 1, in the open position O of the four-joint hinge 4 illustrated in FIG. 2, imposes a load on the shorter link 6, which should not buckle under this load, in order to prevent a pivoting-tilting movement of the front hood 1. The shear-off bolt 21 and any further stops are used to suppress the buckling of the short link 6 about the riveted joint 6c. It can be seen that both in the closed position S and in the open position O the length and condition of the shorter link 6 remains substantially unchanged.

Figure 3:
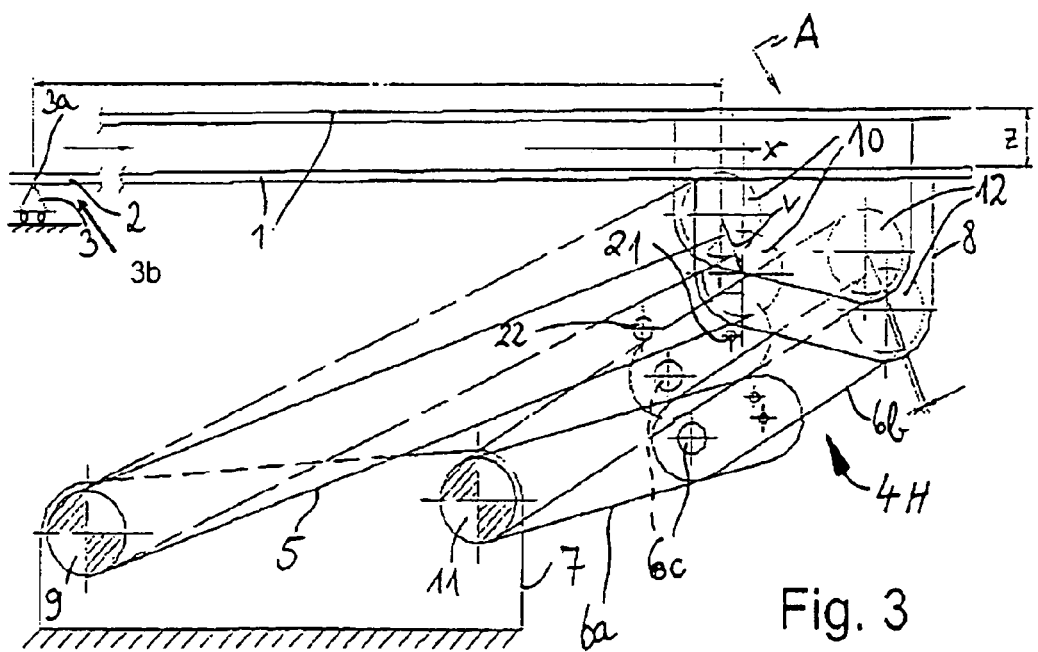
FIG. 3 shows a diagrammatic side view of the four-joint hinge from FIG. 2 with the front hood in the overloaded position.

FIG. 3 illustrates the overload situation caused by the impact of a pedestrian on the front hood 1 and the resulting deformation of the four-joint hinge 4 overall and in particular of the shorter link 6 in more detail. In FIG. 3, the closed position S is illustrated in dashed lines, while the overload position H caused by the impact of a pedestrian, which is diagrammatically indicated by arrow A, is illustrated in continuous lines. Moreover, FIG. 3 diagrammatically depicts the hood lock 3 which, as can be seen from the diagrammatic illustration, is arranged displaceably on the body and includes horizontally adjacent space 3b, in order to allow a horizontal displacement of the front hood 1 which is associated with pivoting of the front hood 1 about the axis which is formed in the hood lock and is denoted by 3a. It can be seen that the front hood 1, in the region of the hood part 8 mounted on it, executes a displacement travel v, which is illustrated by the arrow drawn on the axis of the rotary joint 10. The travel v is composed of a horizontal component x and a vertical component z, which are likewise shown in FIG. 3. It can therefore be seen that, in the event of a collision with a pedestrian, the front hood is lowered by the amount z, and accordingly reduces its distance from the parts in the engine compartment which may be hard and therefore risk causing injury, while, at the same time, the front hood 1 and therefore also the hood lock 3 are displaced by the amount x toward the rear, as seen in the direction of travel. If the shorter link 6 were, like the longer link 5, of rigid design, the translational movement could not be completed by the four-joint hinge 4, since the four joints 9 to 12 only define one pivoting travel, namely that which forms the basis for the opening movement of the front hood 1, and therefore the translational movement would be statically overdetermined. Since the shorter link 6 is designed so that it can be separated into two parts, the static overdetermination of the four-joint mechanism 4 is eliminated, and the impact energy produced by the impact of a pedestrian on the front hood 1 is converted into the corresponding deformation energy (and into further energy components which reduce the impact for other reasons). The change in position of the axis of the joint 12 of the shorter link 6 is denoted by d in FIG. 3. It can be seen that for a relatively significant vertical displacement, a short effective lengthening of the shorter link 6 is sufficient. It can also be seen that, as a result of the shorter link 6 being separated into two parts, the effective angular position of the two links 5 and 6 with respect to one another has changed slightly, this position otherwise statically determining the four-joint mechanism 4.

Under the load caused by the impact of a pedestrian, the bolt 21 shears off as a result of the shock transmitted by the stop 22, and the rotary joint 6c is released, the resulting underdetermination of the four-joint hinge 4 meaning that the front hood 1 is no longer held in its closed position S, but rather drops its overload position H. The impact energy is in this case converted into the energy required to shear off the bolt 21, so that the actual buckling of the shorter link 6 caused by the pivoting movement about the rotary joint 6c at the same time involves conversion of the impact energy and therefore damping of the impact. It should be understood that instead of the bolt 21 it is also possible to provide other, including larger parts which, on account of a plastic deformation during the shearing or on account of an elastic deformation, for example through their design as a spring, are able to store or consume relatively large amounts of energy. The arrangement of the two partial links 6a, 6b and of the shear-off bolt 21 is in this case selected in such a manner that that part of the lower partial link 6a which projects beyond the auxiliary joint 6c does not project into the displacement travel of the front hood 1, where it would form a hard object which could cause injury to a pedestrian, but rather the projecting part is advantageously kept out of the displacement zone of the front hood 1.

For example, it is particularly preferably possible to arrange around the joint 6 a torsion spring, one end of which is prestressed against the partial link 6a and the other end of which is prestressed against the partial link 6b and which can be stressed toward dropping of the four-joint hinge 4, in order to reduce the severity of an impact of a pedestrian, but, in its stressing direction, is prevented from pivoting beyond the aligned position of the two partial links 6a, 6b by means of end stops. In this context, it should be noted that the ideally typical portrayal of the links 5, 6 as straight links is the embodiment which is simplest to implement, but it is equally possible for the links 5, 6 to be of curved design, in which case the ideal links would coincide with the axes of the links 5, 6 as described in the exemplary embodiment.

Unless expressly stated otherwise, in the description of the exemplary embodiments which follows, the same reference numerals denote the same parts as in FIGS. 1 to 3, and to this extent reference is made to the above explanations, in order to avoid repetition.

Figure 4:
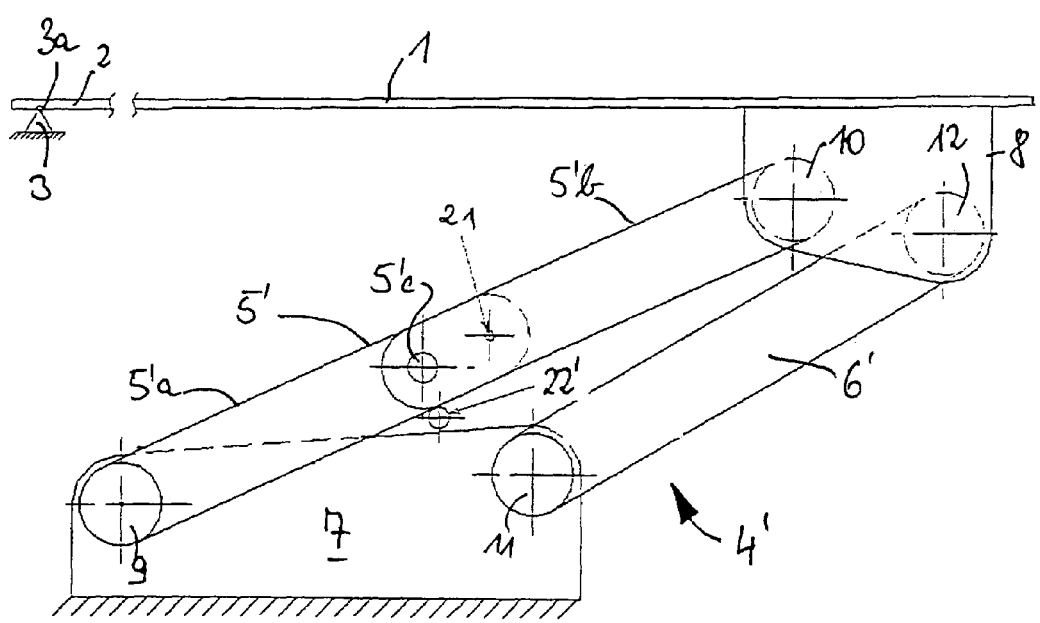
FIG. 4 shows a diagrammatic side view of a further embodiment of a four-joint hinge of the front-hood arrangement from FIG. 1 with the front hood closed.

A further embodiment of a four-joint hinge 4' for a front-hood arrangement as shown in FIG. 1 is illustrated in FIG. 4. This front-hood arrangement portrays the closed position S of the front hood 1.

Unlike in FIGS. 2 and 3, in the present embodiment it is not the shorter link 6' but rather the longer link 5' which is designed so that it can be separated into two parts. The embodiment of the hinge 4' which is shown in FIG. 4 has the advantage, in particular, that in the open position (not shown), most of the dead weight of the front hood 1 together with the hood part 8 arranged thereon is taken up by the shorter link 6' which, however, is designed to be rigid and cannot be separated into two parts, so that the elastically or plastically deformable connecting means 21 can be better adapted to the impact characteristics. The structure of the link 5' with parts 5'a, 5'b and 5'c corresponds to the structure of the link 6 which can be separated into two parts shown in FIGS. 2 and 3. In this exemplary embodiment, the stop 22' is arranged on the body part.

Figure 5:
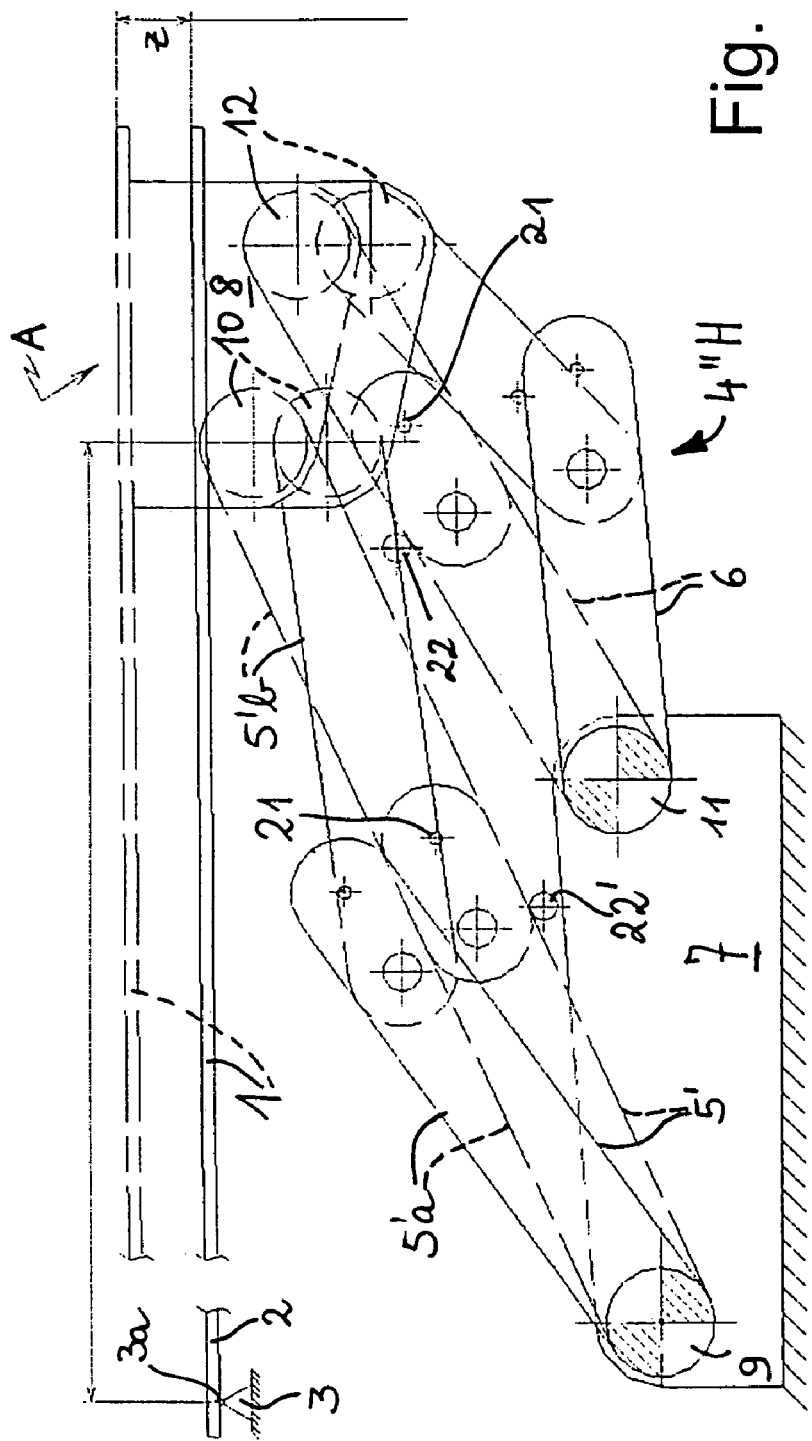
FIG. 5 shows a diagrammatic side view of a further embodiment of a four-joint hinge of the front-hood arrangement from FIG. 1 with the front hood closed and overloaded.

It is possible to design a further embodiment, illustrated in FIG. 5, of a four-joint hinge 4" for a front-hood arrangement as shown in FIG. 1 in such a manner that the longer link 5' from FIG. 4 and the shorter link 6 from FIGS. 2 and 3, which can both be separated into two parts, are incorporated together in one four-joint hinge. This preferred design of a four-joint hinge 4 in particular has the advantage that, given a correspondingly favorable arrangement of the rotary joints 6c and 5'c, the four-joint hinge 4 defines a blocked double four-joint mechanism, in which as a rule the intermediate joints 6c and 5'c are not used, but in the event of an overload they, together with the joints 10, 12 in the hood part, form a new four-joint mechanism. In this case, stops or the like are able to ensure that the frame-side partial links 5'a, 6a are prevented from dropping and the new four-joint mechanism then defines a new pivoting range about the pivot axis 3a of the hood lock 3, which would then not be designed to be horizontally displaceable. It can be seen that, with the multiple-joint hinge 4", horizontal displacement of the front hood 1 in the event of an overload no longer occurs, so that the hood lock 3 can be of conventional design.

Alternatively, it is possible to provide the stops in the region of the partial links 5'b, 6b, with the result that then the "lower" four-joint mechanism comprising the joints 9, 11, 5'c and 6c would be active. A particular advantage of this design consists in the fact that the impact energy is distributed to both links (of both four-joint hinges) in order to shear off the bolt 21 or, given a corresponding design, to extend a spring, with the result that the conversion of the energy can be improved. In particular, it is possible for the shear-off bolts 21 then to be designed in such a manner that, in a defined manner, firstly one and then the other shears off. This is particularly significant if different impact energies, for example in the event of an asymmetric impact on the front hood 1 or in the event of a differing weight of the person causing the impact, for example in the case of a child or an adult, are to be taken into account in the design.

Figure 6:
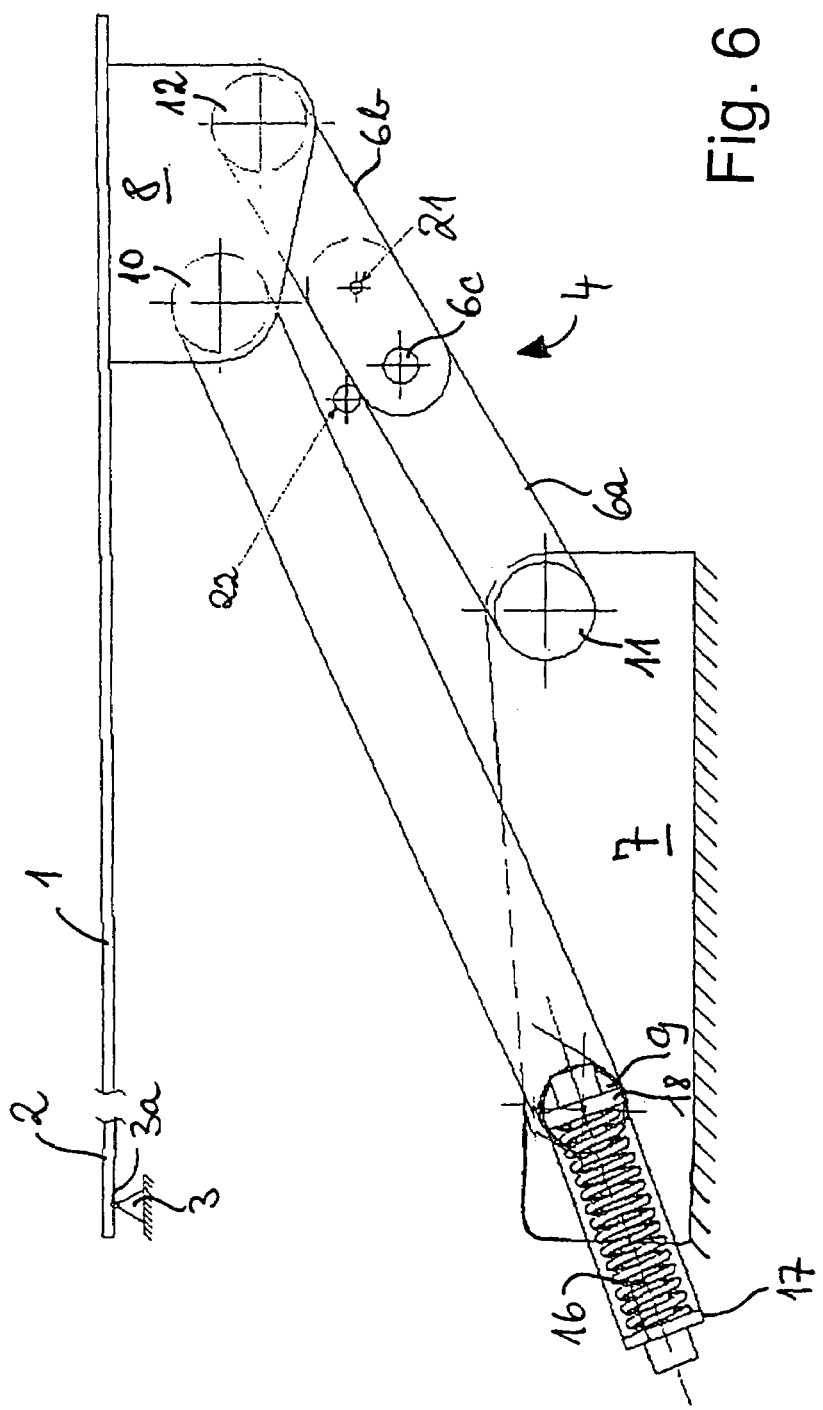
FIG. 6 shows a diagrammatic side view of a further embodiment of a four-joint hinge of the front-hood arrangement from FIG. 1 with the front hood closed.

A further advantageous embodiment of a four-joint hinge 4 for the front-hood arrangement from FIG. 1 is illustrated in FIG. 6, which shows a refinement of the front-hood arrangement from FIGS. 1 to 3 with four-joint hinge 4, this refinement also being suitable for the four-joint hinge 4' or a combination of the two. In the refined front-hood arrangement, one of the rotation points 9 and 11 of the longer link 5 or shorter link 6 is not mounted rigidly in the frame part 7, but rather can be compressed relative to the frame part 7 counter to the prestress of an energy storage unit 16, which is designed as a compression spring, substantially as an extension of the extent of the longer link 5 assigned to the spring 16. This makes the position of the rotary joint 9 variable, with the result that the hood lock 3 does not need to execute a horizontal displacement x as in FIG. 3, but rather the front hood 1 only executes a pivoting movement about the axis 3a of the hood lock 3.

In the embodiment shown in FIG. 6, the energy storage unit 16 is arranged approximately as an axial extension of the longer link 5 and bears its rotary joint 9 assigned to the frame part 7 on a slide 18 arranged in a guide 17. The guide 17, which is integrated in the frame part 7, is substantially aligned with the extent of the longer link 5 in the event of a load H, on account of the load of an impact A of a pedestrian. The separating of the shorter link 6 into two parts takes place in a similar manner to that shown in the embodiment illustrated in FIGS. 2 and 3, about the rotary joint 6c, which is preferably formed by a shear-off bolt 21 or a compression spring.

Figure 7:
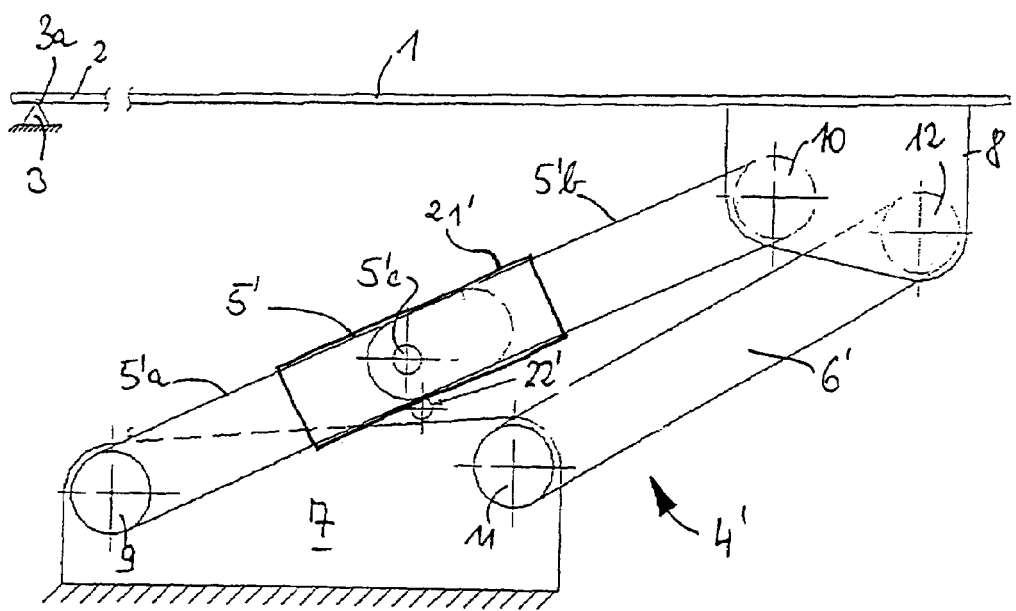
FIG. 7 shows a diagrammatic side view of a further embodiment of a four-joint hinge of the front-hood arrangement from FIG. 1 with the front hood closed.

A further embodiment of a four-joint hinge 4' for a front-hood arrangement as shown in FIG. 4 is illustrated in FIG. 7, which portrays the closed position S of the front hood 1. As in FIG. 4, the longer link 5' is designed so that it can be separated into two parts, and the same reference numerals denote the same parts therein. In this embodiment, however, instead of having an elastically or plastically deformable connecting means to provide locking of partial links 5'a and 5'b, link 5' is provided with a preferred deformable component 21' in the form of a covering of the intermediate joint 5' made from foam or plastic which can be blown off. Alternatively, it is possible for the at least one link 5' which can be separated into two parts 5'a and 5'b to be designed as a link which is divided into two short link parts which, by means of an injection-molded plastic cladding, define a desired breaking point which breaks in the event of the normal load being exceeded and thus release the four-joint system without an intermediate joint being provided.

The invention has been explained in more detail above with reference to various exemplary embodiments which have all shown locking means which are designed irreversibly, as shear-off bolts, these locking means being particularly inexpensive. It will be understood that, in the same way as the plastically changeable material components 21, it is also possible to provide springs which effect reversible-locking and unlocking of the link 5' and/or 6 which is designed so that it can be separated into two parts; these springs consequently entail lower mechanical outlay after an impact to restore readiness for driving.

What is claimed is:

1. A front hood assembly for attachment to a vehicle, comprising
a front hood;
at least one hood lock for closing said front hood, and
at least one multiple-joint hinge for coupling said front hood to a frame of said vehicle, said at least one multiple-joint hinge comprising at least one link for opening and closing said front hood,
wherein a rear region of said front hood is displaceable in the event of an impact of a predetermined overload into a position that is lowered with respect to a closed position,
wherein said at least one link, when the rear region of said front hood is displaced into the lowered position, can be at least partially separated into at least two partial links.

2. A front hood assembly for attachment to a vehicle, comprising
a front hood,
at least one hood lock for closing said front hood, and
at least one multiple-joint hinge for coupling said front hood to a frame of said vehicle, said at least one multiple-joint hinge comprising at least one link for opening and closing said front hood,
wherein a rear region of said front hood is displaceable in the event of an impact of a predetermined overload into a position that is lowered with respect to a closed position,
wherein said at least one link, when the rear region of said front hood is displaced into the lowered position, can be at least partially separated into at least two partial links, and
wherein the two partial links are articulately connected to each other.

3. The front hood assembly as claimed in claim 1, wherein two of the at least two partial links are connected to one another by means of a shear-off bolt.

4. The front hood assembly as claimed in claim 3, wherein, under the load of an impact of a predetermined overload, the shear-off bolt releases a rigid connection between said two of the at least two partial links.

5. The front hood assembly as claimed in claim 3, wherein the shear-off bolt is replaceable.

6. The front hood assembly as claimed in claim 1, wherein the front hood has two sides, and
wherein a multiple-joint hinge is arranged on each side of the front hood.

7. The front hood assembly as claimed in claim 1, wherein said vehicle comprises a windshield, and
wherein the front hood, at the same time as the at least one link is being at least partially separated into two partial links, executes a translational movement in the direction toward said windshield of the vehicle.

8. The front hood assembly as claimed in claim 1, wherein the two partial links are articulately connected to each other,
wherein said at least one link of said multiple-joint hinge is coupled to said front hood via at least one rotary joint that is mounted on said front hood,
wherein said at least one link of said multiple-joint hinge is coupled to a said frame via at least one rotary joint that is mounted on said frame,
said at least one link of said multiple-joint hinge further comprising an intermediate joint between said two partial links,
such that, in the event of an impact of a predetermined overload on said front hood, said at least one front hood rotary joint executes a defined movement about said intermediate joint.

9. The front hood assembly as claimed in claim 8,
wherein the multiple-joint hinge is designed as four-joint hinge, said four-joint hinge comprising a second link,
wherein said second link is coupled to said front hood via at least one rotary joint that is mounted on said front hood,
wherein said second link is coupled to a said frame via at least one rotary joint that is mounted on said frame,
such that, in the event of an impact of a predetermined overload on the front hood, the frame rotary joint of the second link is displaced and stresses an energy storage unit in order to at least partially compensate for the fact that the link that can be separated into at least two parts has been separated.

10. The front hood assembly as claimed in claim 9,
wherein the energy storage unit is arranged substantially as an axial extension of the second link, and
wherein said energy storage unit is stressed when the mounting part of the four-joint hinge arranged on the front hood has been displaced out of its starting position as a result of a separation of the connection of the link that can be at least partially separated into two parts in the event of an impact of a predetermined overload on the front hood.

11. The front hood assembly as claimed in claim 1,
wherein the hood lock allows horizontal displacement of the front hood in its closed position.

12. The front hood assembly as claimed in claim 11,
wherein the hood lock overall is displaceable.

13. The front hood assembly as claimed in claim 11,
wherein the hood lock comprises a yield space adjoining its closed position, and
wherein the yield space provides defined guidance for a substantially horizontal displacement in a rearward direction of one of the front hood and of a holding part connected to the front hood.

14. The front hood assembly as claimed in claim 11,
wherein an energy storage member prestresses the hood lock in a direction opposite to the direction of horizontal displacement,
such that, in the event of an impact of a predetermined overload, the energy storage member can be stressed, so as to absorb some of the impact energy.

15. A front hood assembly for attachment to a vehicle, comprising
a front hood;
at least one hood lock for closing said front hood, and
at least one multiple-joint hinge for coupling said front hood to a frame of said vehicle, said at least one multiple-joint hinge comprising at least one link for opening and closing said front hood,
wherein a rear region of said front hood is displaceable in the event of an impact of a predetermined overload into a position that is lowered with respect to a closed position,
wherein said at least one link, when the rear region of said front hood is displaced into the lowered position, can be separated into at least two partial links,
wherein said at least one link that can be at least partially separated into two parts comprises two rotation points that are separated by a distance, and wherein said distance between said two rotation points of the at least one link is reduced in the event of the impact of the predetermined overload with said front hood.

16. The front hood assembly as claimed in claim 1, wherein the multiple-joint hinge is arranged on the frame of the vehicle in a manner such that the front hood can be opened when the hood lock is released without the at least one link of the multiple-joint hinge being at least partially separated into two parts.

17. The front hood assembly as claimed in claim 1, wherein the multiple-joint hinge is designed as a four-joint hinge.

18. A front hood assembly for attachment to a vehicle, comprising
a front hood;
at least one hood lock for closing said front hood, and
at least one multiple-joint hinge for coupling said front hood to a frame of said vehicle, said at least one multiple-joint hinge comprising at least one link for opening and closing said front hood,
wherein said front hood is displaceable in the event of an impact of a predetermined overload into a position that is lowered with respect to a closed position,
wherein said at least one link, during an opening and a closing operation of said hood, is pivoted with respect to the frame and with respect to the front hood,
wherein said at least one link, when said front hood is displaced into the lowered position, can be at least partially separated into at least two partial links,
wherein the two partial links are articulately connected to each other,
wherein the multiple-joint hinge is designed as a four-joint hinge, and
wherein the two partial links, in an overload situation, adopt an angle with respect to one another which compensates for the displacement travel of an other, unseparated link of the four-joint hinge.

19. The front hood assembly as claimed in claim 1, wherein the front hood, when the vehicle is ready to drive, is arranged in a resilient, raised position.

20. A front hood assembly for attachment to a vehicle, comprising
a front hood;
at least one hood lock for closing said front hood, and
at least one four-joint hinge for coupling said front hood to a frame of said vehicle, said at least one four-joint hinge comprising a first link and a second link, each link having a first and a second joint, the first joint being arranged to the front hood and the second joint being arranged to the frame, the second joints of the first and second links being arranged to the frame at a distance from each other,
said at least one four-joint hinge comprising at least one link that can at least partially separate into at least two parts in the event of an impact of a predetermined overload.

21. A front hood assembly for attachment to a vehicle, comprising
a front hood;
at least one hood lock for closing said front hood, and
at least one four-joint hinge for coupling said front hood to a frame of said vehicle,
said at least one four-joint hinge comprising two joints mounted at said front hood at a distance from each other and two joints mounted at said frame at a distance from each other, and further comprising at least one link that can at least partially separate into at least two parts in the event of an impact of a predetermined overload,
wherein the at least one link can be separated under the load of an impact of a predetermined overload into two articulately connected partial links.

22. The front hood assembly as claimed in claim 21, wherein the two partial links adopt an angle with respect to one another which compensates for the displacement travel of a second, unseparated link of the four-joint hinge.

23. The front hood assembly as claimed in claim 21, wherein the at least two partial links are connected to one another by means of a shear-off bolt, and
wherein, under the load of an impact of a predetermined overload, the shear-off bolt releases a rigid connection between the at least two partial links.

24. The front hood assembly as claimed in claim 20, wherein the front hood has two sides, and
wherein a four-joint hinge is arranged on each side of the front hood.

25. The front hood assembly as claimed in claim 20, wherein said vehicle comprises a windshield, and
wherein the front hood, at the same time as the at least one link is being at least partially separated into two partial links, executes a translational movement in the direction toward said windshield of the vehicle.

26. A front hood assembly for attachment to a vehicle, comprising
a front hood;
at least one hood lock for closing said front hood, and
at least one four-joint hinge for coupling said front hood to a frame of said vehicle,
said at least one four-joint hinge comprising at least one link that can at least partially separate into at least two parts in the event of an impact of a predetermined overload,
wherein the at least one link and a second link of the four-joint hinge comprise rotary joints that are mounted at a predetermined distance from each other on the front hood,
wherein the at least one link and the second link of the four-joint hinge comprise rotary joints that are mounted on the frame,
said at least one link of said multiple-joint hinge further comprising an intermediate joint between said two partial links,
such that, in the event of the impact of the predetermined overload on the front hood, the front hood rotary joints execute a defined movement about the intermediate joint and about the frame rotary joint of the second link.

27. The front hood assembly as claimed in claim 26, wherein, in the event of an impact of a predetermined overload on the front hood, the frame rotary joint of the second link is displaced and stresses an energy storage unit in order to at least partially compensate for the fact that the link that can be at least partially separated into at least two parts has been at least partially separated.

28. The front hood assembly as claimed in claim 27, wherein the energy storage unit is arranged substantially as an axial extension of the second link when the mounting part of the four-joint hinge arranged on the front hood has been displaced out of its starting position as a result of an at least partial separation of the connection of the link that can be at least partially separated into two parts in the event of an impact of a predetermined overload on the front hood.

29. The front hood assembly as claimed in claim 20, wherein the hood lock allows horizontal displacement of the front hood in its closed position.

30. The front hood assembly as claimed in claim 29, wherein the hood lock overall is displaceable.

31. The front hood assembly as claimed in claim 29, wherein the hood lock comprises a yield space adjoining its closed position, and wherein the yield space provides defined guidance for a substantially horizontal displacement in a rearward direction of one of the front hood and of a holding part connected to the front hood.

32. The front hood assembly as claimed in claim 29, wherein an energy storage member prestresses the hood lock in a direction opposite to the direction of horizontal displacement, and such that, in the event of an impact of a predetermined overload, the energy storage member can be stressed, so as to absorb some of the impact energy.

33. A front hood assembly for attachment to a vehicle, comprising a front hood;

at least one hood lock for closing said front hood, and at least one four-joint hinge for coupling said front hood to a frame of said vehicle, said at least one four-joint hinge comprising at least one link that can at least partially separate into at least two parts in the event of an impact of a predetermined overload, wherein said at least one link, during an opening and a closing operation of said hood, is pivoted with respect to the frame and with respect to the front hood, wherein said at least one link that can be separated into two parts comprises two rotation points that are separated by a distance, and wherein said distance between the two rotation points of the at least one link is reduced in the event of the impact of the predetermined overload with said front hood.

34. The front hood assembly as claimed in claim 20, wherein the four-joint hinge is arranged on the frame of the vehicle in such a manner that the front hood can be opened when the hood lock is released without the at least one link of the four-joint hinge being at least partially separated into two parts.

35. The front hood assembly as claimed in claim 20, wherein the front hood, when the vehicle is ready to drive, is arranged in a resilient, raised position.

36. A motor vehicle, comprising a frame, a front hood, a hood lock, the hood lock being arranged in a front portion of the front hood and locks the front hood in a position substantially corresponding to a closed position, and two four-joint hinges for coupling the front hood at a rearward end thereof to the frame, wherein the front hood is maintained normally in a resilient elevated position, wherein each four-joint hinge comprises two joints mounted at said front hood at a distance from each other and two joints mounted at said frame at a distance from each other, and further comprises at least one link that can be at least partially separated into at least two partial links, such that the front hood is capable of cushioning the impact of a predetermined overload by being lowered from said elevated position to a lowered position upon the at least partial separation of the at least one link.

37. The front hood assembly as claimed in claim 2, further comprising a rigid connection between the at least two partial links includes a destructible covering of the at least two partial links, the destructible covering alone holding the at least two partial links with respect to one another.

38. The front hood assembly as recited in claim 20, wherein the at least one four-joint hinge includes a second link that can be separated into at least two second link parts in the event of an impact of a predetermined overload, wherein the at least two second link parts are articulately connected to each other.

* * * * *